United States Patent [19]
Siegmund

[11] 3,899,314
[45] Aug. 12, 1975

[54] LENS MANUFACTURING PROCESS

[75] Inventor: Walter P. Siegmund, Woodstock, Conn.

[73] Assignee: American Optical Corporation, Southbridge, Mass.

[22] Filed: Mar. 18, 1974

[21] Appl. No.: 452,177

[52] U.S. Cl. .................. 65/23; 65/31; 65/60; 65/65 A; 65/99 A; 65/121; 65/177; 156/99
[51] Int. Cl. ............................................. C03c 19/00
[58] Field of Search ......... 65/23, 31, 121, 177, 60, 65/182 R, 65 R, 99 A, 65 A; 156/99, 155

[56] References Cited
UNITED STATES PATENTS

| | | | |
|---|---|---|---|
| 1,332,410 | 3/1920 | Potts | 65/60 X |
| 1,739,743 | 12/1929 | Ustonson | 65/39 |
| 1,975,397 | 10/1934 | Kreidl | 65/60 X |
| 2,305,683 | 12/1942 | Engels | 65/60 X |
| 2,500,105 | 3/1950 | Weber | 65/121 |
| 2,795,084 | 6/1957 | Littleton | 65/23 X |
| 3,193,367 | 7/1965 | Giffen | 65/177 |
| 3,218,143 | 11/1965 | De Lajarte | 65/65 A |
| 3,256,081 | 6/1966 | Peyches et al. | 65/182 R X |
| 3,351,446 | 11/1967 | Pilkington et al. | 65/182 R |
| 3,505,051 | 4/1970 | Buckley et al. | 65/6 UX |
| 3,746,526 | 7/1973 | Giffon | 65/3 |
| 3,849,095 | 11/1974 | Giffon et al. | 65/121 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

Manufacturing semifinished and certain finished opthalmic lenses without surface grinding and polishing operation. A flat preform comprised of a thickness of a desired lens glass, e.g. ophthalmic crown, and a lesser thickness of a chemically soluble protective glass fused to at least one side of the lens glass with a smooth, blemish-free interface is produced and thence cut and pressed or slumped to the meniscus shape desired of the ophthalmic lens. The lens is completed by removing the protective glass with a suitable solvent to expose the underlying smooth, blemish free surface(s) of the lens glass for ophthalmic use without further working.

10 Claims, 13 Drawing Figures

PATENTED AUG 12 1975　　　3,899,314

SHEET 1

LENS MANUFACTURING PROCESS

BACKGROUND OF THE INVENTION

1. Field of the Invention

This invention relates to the manufacture of ophthalmic lenses and other products requiring surface finishes of ophthalmic quality and has particular reference to semifinished and certain finished ophthalmic lenses.

2. Description of the Prior Art

Heretofore, ophthalmic lenses formed of glass were produced by grinding and polishing both of opposite faces or surfaces of blanks made by pressing, casting, slumping or otherwise forming gobs, rods or sheets of glass to shapes roughly conforming to the ultimate shapes desired of the finished product.

In the usual case of producing a prescription (Rx) ophthalmic lens, a semifinished lens or blank having a ground and polished optical surface on one of its sides is further ground and polished on its opposite side to a predetermined spherical or compound curvature and depth (center thickness) according to the prescription requirements of the Rx lens.

Semifinished lenses are normally supplied to ophthalmic lens dispensers with a variety of different curvatures on their finished surfaces each heretofore produced with costly timeconsuming multiple grinding, polishing and cleaning operations requiring complex and expensive apparatuses.

The costliness of producing ground and polished semifinished lenses is, accordingly, reflected in the current high cost to the consumer of finished ophthalmic lenses and the time-consuming aspect of grinding and polishing is a serious hindrance to meeting the demands of Rx dispensers for semifinished lens stock.

In overcoming the foregoing and related drawbacks of high cost and lengthy production schedules, the present invention has uniquely obviated surface grinding and polishing operations in the manufacture of semifinished and certain finished ophthalmic lenses. Moreover, the present invention overcomes the drawbacks of surface blemishing heretofore inherent in cane molding or hot pressing from freshly made glass.

While conventionally cane molded or gob formed lenses may have some utility, e.g. as light-transmitting condenser lenses, they have not heretofore been of ophthalmic quality nor useful as image-forming (objective) lenses.

In addition to the applicability of the present invention to the making of semifinished ophthalmic lenses, the instant process may be applied at least in certain cases to the manufacture of finished ophthalmic lenses without grinding and/or polishing operations.

It is to be understood that the expression "finished" as used herein with reference to lenses or other products is intended to refer to products having oppositely disposed surfaces of ophthalmic quality (smoothness) whether or not such products are cut, ground, punched or otherwise edged to their final peripheral configurations. Furthermore, any reference herein to "other products" is intended to include such items as non-ophthalmic lenses, mirrors, prisms and the like as well as pressed wear, containers, faceplates for electron image tubes and similar glass objects requiring one or more highly finished surfaces.

SUMMARY OF THE INVENTION

The objective of the invention and its corollaries are accomplished by first producing a preform of the lens or glass article to be manufactured wherein the preform comprises a thickness of the main glass of the article and a lesser thickness of a chemically soluble protective glass fused to at least one side of the main glass with a smooth, blemish-free interface. The preform is then punched or otherwise cut and pressed or slumped to the particular shape desired of the finished article and the protective glass is removed with a suitable solvent to expose its underlying smooth, blemish-free surface(s).

In the manufacture of ophthalmic lenses in particular, the fused laminate of the main glass and soluble protective glass is pressed or slumped to the meniscus shape desired of the ophthalmic lens and removal of the protective glass by dissolution (etching) renders the lens immediately adaptable to ophthalmic use without further working of its surfaces.

The invention will be more fully understood by reference to the following detailed description when taken in conjunction with the accompanying drawings.

IN THE DRAWINGS

Figure 9:
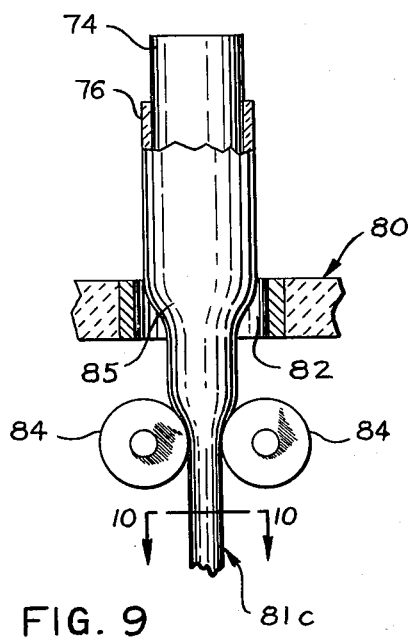
Figures 10, 11:
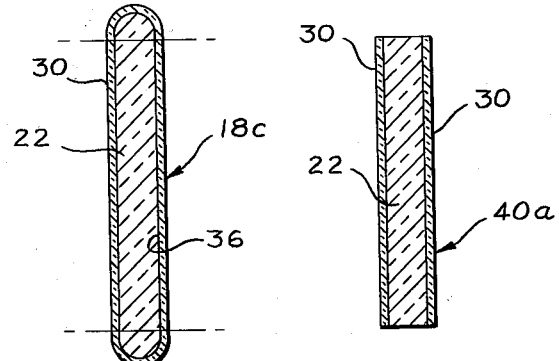
FIG. 10 is a cross-sectional view taken generally along line 10—10 looking in the direction of the arrows.
FIG. 11 is a cross-sectional view of a type of preform which may be produced according to the modification of the invention illustrated in FIGS. 9 and 10.
Figure 13:
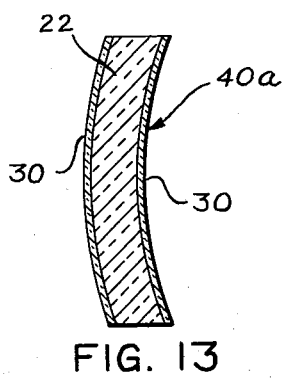
Figure 12:
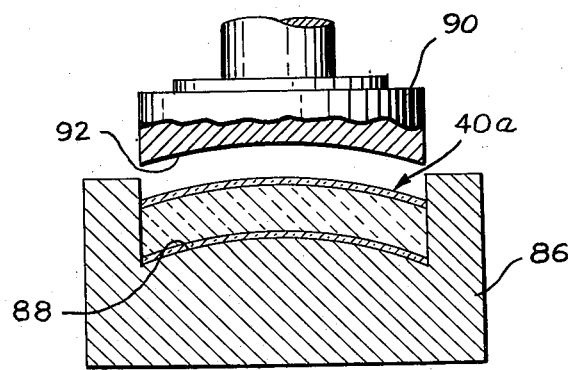

FIG. 12 is a diagrammatic illustration of an operation which may be performed upon a preform of the type illustrated in FIG. 11 in the process of producing a lens therefrom; and FIG. 13 is an illustration, in cross-section, of a partially finished lens resulting from the steps of the embodiment of the invention illustrated in FIGS. 9–12 and from which a finished or semifinished ophthalmic lens blank may be produced.

DESCRIPTION OF THE PREFERRED EMBODIMENTS

Figure 1:
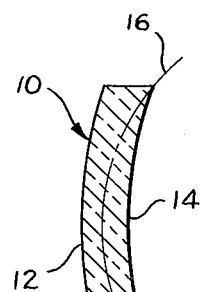
FIG. 1 is an illustration, in cross-section, of a semifinished ophthalmic lens exemplary of a type which may be produced according to the process of the present invention.
Figure 2:
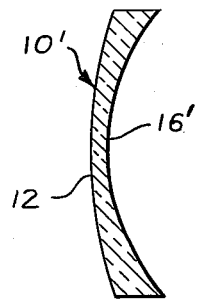
FIG. 2 is an illustration, in cross-section, of a finished ophthalmic lens which may be produced from the semifinished lens of FIG. 1.

The detailed description of this invention will be directed more particularly to embodiments which deal with the manufacture of semifinished and finished ophthalmic lenses, e.g. of types illustrated in FIGS. 1 and 2 respectively. These embodiments of the invention, however, are not to be interpreted as restrictive of the invention beyond that necessitated by the scope of the appended claims since those skilled in the art will readily appreciate that various modifications and adaptations of the precise form shown and described herein may be made to suit particular requirements, i.e. in the manufacture of other products requiring one or more highly finished surfaces.

Referring more particularly to FIG. 1 wherein a semifinished lens 10 is illustrated, this type of lens is one having a surface finish of ophthalmic quality on only one of its sides, i.e. either the convex or concave side. This type of lens is used by dispensers of Rx (prescription) lenses who grind and polish the opposite side of the semifinished lens 10 to a depth and radii of spherical or compound curvature which in combination with the curvature of the aforesaid previously finished surface will produce the Rx lens. For example, considering the convex surface 12 as being the finished surface of semifinished lens 10 (FIG. 1), the practitioner may grind and polish its concave surface 14 to a depth and curvature indicated by dot-dash line 16 with the result of producing a finished ophthalmic lens 10' (FIG. 2). Lens 10' has the same finished surface 12 of lens 10 and a newly formed ground and polished surface 16.

The finished lens 10' may then be peripherally cut and/or ground (edged) to a desired configuration conformable with the lens mounting rim of a spectacle frame to which the finished lens is intended to be applied in the usual manner of preparing ophthalmic lenses for utlimate patient use. The operations of peripherally edging and mounting ophthalmic lenses form no part of the present invention and, accordingly, will not be further dealt with herein.

The expressions "ophthalmic finish" and "ophthalmic quality" as used herein with reference to the character of lens surfaces produced according to this invention are to be interpreted as being descriptive of an exceptional smoothness, i.e. the degree of smoothness having long been established in the art as being that necessary for producing optimum visual acuity when used in conjunction with the eyes. While such surfaces are usually tested or inspected for their degree of smoothness by optically or otherwise comparing a surface under test with a preselected standard, the aforementioned expressions ophthalmic finish or ophthalmic quality are herein intended to refer to a surface texture or smoothness meeting or bettering present day standards expected of high quality ophthalmic lenses. These surfaces are expected to be of bright finish and substantially if not completely free of pits, stains, scratches, dimples ("orange-peel" defects) or other discontinuities and waviness.

Figure 3:
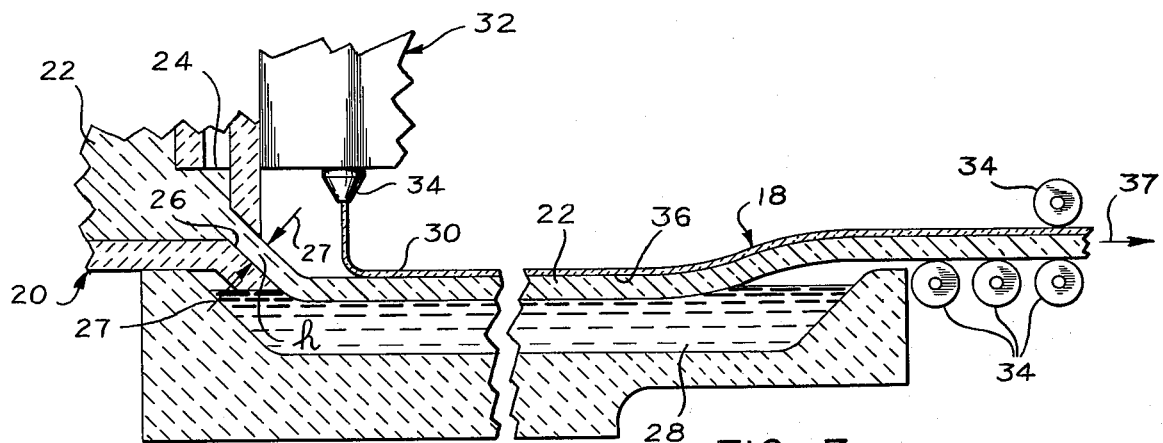
FIG. 3 is a diagrammatic cross-sectional illustration of apparatus and method for accomplishing an initial phase of the process of the invention.
Figure 4:
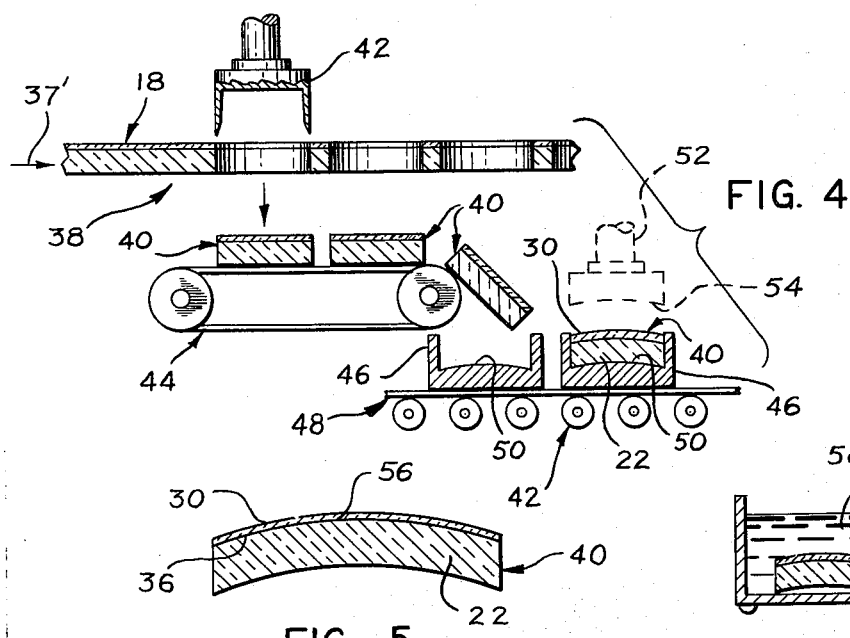
FIG. 4 is a diagrammatic illustration, mainly in cross-section, of apparatus useful in the performance of subsequent steps in the process of the invention.
Figure 6:
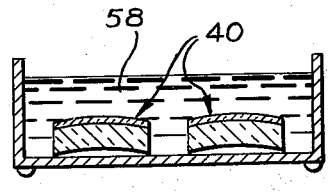
FIG. 6 is a diagrammatic illustration of a technique for performing still another step according to the method of the invention wherewith lenses of the type illustrated in FIG. 5 may be produced.

A mode of operation contemplated for producing semifinished lenses of the type depicted in FIG. 1 is illustrated in FIGS. 3, 4 and 6. FIG. 3, in particular, illustrates a system for producing a basic glass structure or preform 18 from which semifinished lenses, e.g. of the type illustrated in FIG. 1, may be formed.

The system of FIG. 3 includes a tank 20 containing a supply 22 of molted glass (e.g. ophthalmic crown) from which the semifinished lenses are produced according to the invention.

Tank 20 may be the final chamber of a continuous glass producing furnace wherewith its supply of glass 22 is maintained at or above a preestablished level 24 over its exit orifice 26. Orifice 26 is of a height h (distance between arrows 27 in FIG. 3) approximately equal to the thickness desired of glass 22 in preform 18 and of a width preferably slightly greater than the width or diametral dimension desired of semifinished lenses to be produced therefrom. The width of orifice 26 may, alternatively, be equal to twice or additional multiples of the approximate diametral dimensions of the semifinished lenses to be produced therefrom.

The glass 22 of preform 18, upon leaving orifice 26, is directed onto and floated over a pool 28 of molten metal (e.g. tin) and simultaneously provided with a relatively thin covering of a leachable, i.e. chemically soluble glass 30. The latter glass is supplied in a molten state from a separate suitable tank 32 having a rectangular orifice 34 so positioned and of such a controlled size and shape as to cause glass 30 to cover substantially the entire width of glass 22. Tank 32 may be similar in construction and operation to tank 20 described hereinabove or otherwise conventionally constructed and arranged to produce the covering of molten glass 30.

Glass 30, in addition to its being chemically soluble, is so preselected as to be compatible in its coefficient of expansion and softening temperature with glass 22 so that glasses 22 and 30 become smoothly interfacially fused together as preform 18.

Preform 18 is floated for a substantial distance, preferably several feet, over the pool 28 of molten tin and thence over and through supporting and drawing rollers 34. This floating of preform 18 causes the interface 36 between glasses 22 and 30 to become precision flattened and smoothened. Such a flattening and smoothening of preform 18 may be facilitated by adjusting the speed of rotation of rollers 34 relative to the rate of flow of glass from tanks 20 and 32 to the degree that a slight pulling and stretching force is continuously applied to preform 18. By such means, interface 36 is smoothened to a degree of ophthalmic fineness.

Those interested in details of "float glass" manufacturing procedures used to produce smoothly finished flat glass articles may refer to U.S. Pat. Nos. 3,220,816; 3,356,478; or 3,413,107, for example.

Having passed over and through rollers 34, preform 18 is continued in the direction of arrows 36 and 36' (FIGS. 3 and 4 respectively) to a lens forming station indicated generally by arrow 38 in FIG. 4. At this point, lens blanks 40 are cut from preform 18, e.g. by trepanning or punching with tool 42. In the case of trepanning or similarly cutting blanks 40 from preform 18, the preform would preferably be cooled to a relatively rigid state during its travel between rollers 34 and station 38. In the latter case of punching with a tool such as 42, the preform may be maintained in a relatively soft state at least to the point of reaching station 38 and/or heated to an appropriate softness at or adjacent to station 38.

Once cut from preform 18, blanks 40 are conveyed to a shaping station illustrated generally by arrow 42 in FIG. 4 for shaping to a desired, usually meniscus, configuration. In this phase of the system, trepanned or punched blanks 40 dropping onto conveyor 44 are carried to a mold loading point or station 42 wherein they are individually deposited in forming molds 46 constructed of cast iron, high temperature steel or nonmetallic ceramic or silicon carbide refractories and the like.

Conveyor 48 moves the loaded molds 46 to station 42 where blanks 40 are caused to assume and/or conform to the curved molding surface shape of internal mold surfaces 50. This shaping of blanks 40 may be accomplished by applying heat thereto at station 42 of an intensity sufficient to cause the blanks to slump against surface 50. Alternatively, a plunger 52 having a surface 54 of the curvature desired of blanks 40 may be forced against the blanks to effect the aforesaid shaping thereof. Plunger 52 may be preheated, if desired.

From the foregoing description it can be seen that during the entire process of flattening the glass 22 of preform 18 (FIG. 3), forming blanks 40 and shaping same (FIG. 4), the surface of glass 22 at interface 36 is completely protected by glass 30 and thus maintained free of such defects as scratching, dimpling (orange-peel) and particulate inclusions or the like which ordinarily cause indentations and similar imperfections. For example, occurrences of dust and/or other particulate matter, scratches, ridges, and other such imperfections on shaping surface 54 of plunger 52 would ordinarily produce correspondingly shaped dimples, ridges and grooves respectively in surfaces of lens blanks formed without protective glass 30. With the protective glass 30, however, these surface defects may be prevented from reaching interface 36 thereby protecting surface 56 of blank 40 against blemishing.

Completion of the semifinished lenses is accomplished by removing the protective glasses 30 from the slumped or pressed lens blanks 40 to expose the surface 56 of each blank. This produces in each case a semifinished lens of the type illustrated in FIG. 1 wherein the exposed surface 56 of a blank 40 constitutes the finished surface 12 of the semifinished lens.

Removal of the protective glasses 30 may be effected by immersing blanks 40 in a suitable chemical leaching solution 58 (FIG. 6) such as hydrochloric acid.

A chemically soluble glass 30 having a compatible coefficient of expansion and softening temperature suitable for use in conjunction with a conventional ophthalmic crown glass 22 in the formation of preform 18 according to principles of this invention has been found to be a lanthinum borosilicate glass of the following composition in weight percent:

|  | Approximate Wt. % |
| --- | --- |
| $SiO_2$ | 12.7 |
| $B_2O_3$ | 17.2 |
| BaO | 46 |
| $Al_2O_3$ | 2 |
| $La_2O_3$ | 12 |
| $ThO_2$ | 9.6 |
| $As_2O_3$ | .5 |

Other chemically soluble (leachable) glasses useful in the practice of this invention have been referred to in U.S. Pat. Nos. 3,004,368 and 3,624,816.

The leaching solution 58 (FIG. 6) used for removal of the protective glass 30 may comprise a solution of from 5 to 10% (by volume) hydrochloric acid preferably maintained at a temperature of approximately 65°C. Higher or lower solution temperatures and/or concentrations of acid may, of course, be used if desired.

Figure 7:
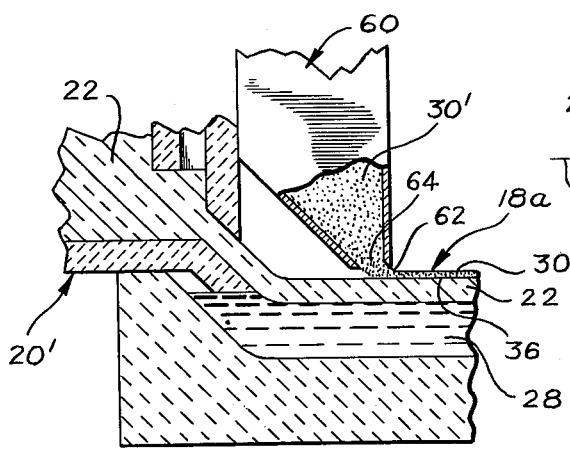
FIGS. 7, 8 and 9 are diagrammatic illustrations of apparatuses and techniques respectively each representing a modification of the invention.

FIG. 7 illustrates a modification of the system shown in FIG. 3. In the modification of FIG. 7, protective glass 30 is applied to the flowing ribbon of glass 22 from a hopper 60 containing frit 30'. As glass 22 is drawn across the pool 28 of molten metal, frit 30' is doctored over glass 22 by the leading edge 62 of orifice 64 of hopper 60. The relatively thin layer of frit 30' so applied to glass 22 becomes nearly instantaneously melted and fused to glass 22 thereby forming the aforementioned interface 36. Preform 18' so produced (i.e. according to FIG. 7) is thereafter processed to form semifinished lenses as diagrammatically illustrated in FIGS. 4 and 6.

Figure 8:
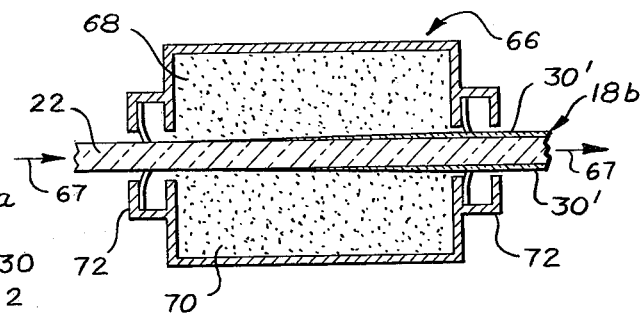

Another technique for applying a chemically soluble protective glass 30' to one or both of opposite sides of glass 22 is illustrated in FIG. 8. In this case, the flow of glass 22 from its supply tank 20 or 20' is directed into a glass evaporating chamber 66. Glass evaporating chamber 66 may comprise only one of compartments 68 and 70 in cases where a corresponding one side only of glass 22 is to be coated with glass 30'. As this embodiment of the invention is illustrated in FIG. 8, however, both sides of glass 22 will become coated with protective glass 30'.

It is to be understood that chambers 68 and 70 contain systems (not shown) for creating and depositing glass evaporants or plasmas upon the main glass 22. Such systems may include ion beam sputtering devices and/or electron beam evaporation devices. The former may comprise an ion beam emitting gun aimed at a source of coating material (a supply of glass 30) which bombards the supply of glass with high kinetic energy thereby discharging glass plasma against the exposed surface or surfaces of glass 2. Chambers 68 and 70 would be evacuated of air and gases (e.g. to a pressure below $10^{-4}$ torr). In the latter case of electron beam evaporation, an electron beam gun would be directed so as to bombard the same or a similar source of coating material discharging a glass plasma with lower kinetic energy against glass 22. A suitable partial vacuum may be maintained in the compartments 68 and 70 of chamber 66 with glands 72 at either end thereof. These glands may be either of a mechanical or fluid type permitting a continuous movement of glass 22 in the direction of arrows 67.

Still another modification of the invention is illustrated in FIGS. 9–12 wherein a glass preform 18c (FIG. 9) similar to preforms 18, 18a and 18b described hereinabove may be produced with a system of drawing, fusing and rolling operations. In this embodiment of the invention, a rod or slab 74 of glass of the type desired of the ultimate lens to be formed (e.g. ophthalmic crown) is sheathed with a tube, sleeve or contiguous sections of a suitable chemically soluble glass 76. This type of assembly may be produced from cast or otherwise preformed rigid components or extruded from molten glasses as a glass clad glass component of the general type shown and described in U.S. Pat. No. 2,992,517, for example.

Considering components 74 and 76 of the assembly 78 (FIG. 9) to be a rod and tube respectively for purposes of illustrating this embodiment of the invention, the assembly 78 is gradually lowered through a suitable heating element 80 wherewith assembly 78 is gradually zone heated along its length to a temperature causing fusion of components 74 and 76 and permitting assembly 78 to be drawn. With continual movement of assembly 78 slowly longitudinally through heating zone 82 and drawn with rollers 84, the fused unit is necked down at section 85 and rolled to the desired final thickness and width of preform 18c.

As shown in FIG. 10 preform 18c is comprised of a central thickness of lens glass 22 and an outer protective coating or layer of removable glass 30 formed of the glass of tube 76. The preform 18c, upon emerging from rollers 84 may then, if desired, be floated horizontally over a pool of molten metal such as pool 28 (FIG. 3) for enhancing the smoothness and flatness of interface 36 (FIG. 10). Other than the fact that the layer 30 of removable glass completely surrounds opposite sides and edges of preform 18c, the structure of this preform, to the extent of its having a main glass 22 and coating upon one side, is substantially identical to preform 18 or 18a (FIGS. 1 and 7).

Figure 5:
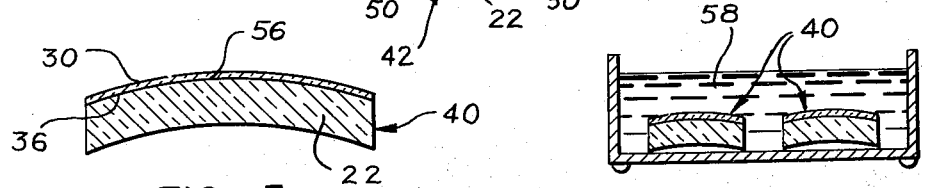
FIG. 5 is an illustration, in cross-section, of a lens resulting from practice of the method steps diagrammatically illustrated in FIGS. 3 and 4.

In proceeding to produce either semifinished or finished lenses from preform 18c of FIGS. 9 and 10, a flat blank 40a (FIG. 11) is trepanned, punched or otherwise removed from preform 18c preferably in the manner described hereinabove relative to blanks 40 of FIGS. 4–6.

A blank 48 so removed from preform 18c and having protective layer 30 is then placed in a forming mold 86 (FIG. 12) and heated to a point where it will slump under its own weight against surface 88 of mold 86 and conform to the shape of surface 88. Blank 48 may, alternatively, be pressed to the shape illustrated in FIG. 12 by means of plunger 90 having molding surface 92.

Plunger 90 and mold 86 may be heated sufficiently to soften blank 40a and/or maintain the blank in a state of softness permitting the aforesaid shaping thereof.

Blank 40a having been shaped either by slumping and/or pressing to a desired meniscus configuration is completed for use either as a semifinished or finished lens.

In completing blank 40a for use as a semifinished lens, e.g. similar to lens 10 of FIG. 1, blank 40a is immersed in a leaching solution for a period of time sufficient to remove protective glasses 30 therefrom. This leaching operation may be performed in the manner illustrated in FIG. 6 and as described hereinabove in connection with blanks 40. In the present case, the leaching operation would simultaneously remove two layers of protective glass 30.

Should it be desired to employ blank 40a (FIG. 13) ultimately as a finished lens such as lens 10' of FIG. 2, the curvatures of its convex and concave sides would both be formed to precontrolled spherical or compound curvatures according to the surface curvatures desired of the finished lens. This may be accomplished by providing mold 86 and plunger 90 with surface curvatures 88 and 92 respectively which correspond in their convex and concave shapes to curvatures desired upon the respective concave and convex sides 16' and 12' of the finished lens to be formed from blank 40a. To complete the finished lens, blank 40a would be immersed in a suitable leaching solution 58 (FIG. 6) for a period of time sufficient to remove both layers of protective glass 30.

As described hereinabove, the protective glass 30 prevents blemishing of the surface of the main lens glass 22 therebeneath during the manufacture of the lens according to principles of this invention and when removed from the lens, the underlying protected surface may be used ophthalmically without the need for further processing by grinding and/or polishing.

It should be understood that removal of the protective layer(s) 30 of chemically soluble glass in any one or more instances of forming either semifinished or finished lenses may be postponed until all work has been completed upon the semifinished or finished lens. In other words, in the manufacture of a semifinished lens, grinding and polishing of one of its surfaces (e.g. surface 14 of lens 10, FIG. 1) and final edge cutting or grinding of the lens to a shape and size required for assembly mounting in a spectacle frame may be completed prior to removal of the protective layer 30.

In the case of manufacturing finished lenses of the type illustrated in FIG. 2, for example, protective glasses 30 on blanks 40a may be kept in place until completion of the edge cutting or grinding operation used to prepare the lens for mounting in a spectacle supporting structure.

The main glass 22 of lens blanks 40 or 40a would typically be several millimeters thick while the protective layers of glass 30 would ordinarily be only a fraction of a millimeter in thickness. These dimensions, however, are given for purposes of illustration only and may, in certain applications of the present invention, each vary by substantial amounts either increasingly or decreasingly. Furthermore, temperatures used to render the exemplary glasses 22 and 30 of suitable viscosities for floating, drawing, fusing one to another, slumping and/or pressing to meniscus shapes have not been discussed in detail hereinabove since it is well within the skill of an artisan to determine appropriate temperatures for the performance of such operations based upon the particular softening temperatures of the specific glasses selected for use in carrying out the process of the present invention. For glasses 22 and 30 of the types described hereinabove, a suitable range of working temperatures may extend from approximately 1,050°C to 1,350°C. Extruding and floating of these glasses would ordinarily require use of the higher temperatures of the aforesaid range. Drawing and shaping (pressing) operations, however, may be performed with the glasses at lower temperatures of the exemplary range.

From the foregoing, it can be seen that the present invention has uniquely obviated surface grinding and polishing operations in the manufacture of semifinished and certain finished ophthalmic lenses and further, the invention overcomes the drawbacks of surface blemishing heretofore inherent in conventional molding or hot pressing operations.

I claim:

1. The method of making a glass article having at least one finished surface of ophthalmic quality comprising the steps of:
    forming a first layer of glass of the type desired of said article, said first layer being of at least the length, width and thickness desired of said article;
    covering at least one side of said first layer of glass with a second relatively thin layer of a removable glass during one stage of the forming of said first layer and fusing the covering layer of glass interfacially to said first layer of glass, the combination of said layers of glass constituting a preform of said article;
    flattening said preform to a degree of precision producing a finish of ophthalmic quality upon said first layer of glass adjacent said covering layer;

heat softening and shaping at least a portion of said preform to at least the approximate shape desired of said article; and removing said covering layer of glass from said portion of said preform to expose the underlying surface of said first layer of glass, said underlying surface constituting said finished surface of said article.

2. The method according to claim 1 wherein said first layer of glass is produced by rendering its constituent materials fluid and flowing a layer of such materials onto a pool of a liquified medium upon which said materials will float and drawing said materials across and away from said pool, said step of flattening being effected by the movement of said glass materials over said pool of said floating medium.

3. The method according to claim 2 wherein said step of covering said first layer of glass with said second layer of glass is effected by directing a supply of said second glass onto said first layer continuously as said first layer is floated over and drawn away from said pool of said floating medium.

4. The method according to claim 3 wherein said second glass is initially in the form of a frit, said frit being doctored over said first layer of glass as said first layer is floated over and drawn away from said pool of floating medium.

5. The method according to claim 1 wherein said flattening of said preform includes a step of rolling the combination of said first and second layers of glass.

6. The method according to claim 1 wherein said first layer of said preform is formed of a rigid piece of glass of the type desired of said article and said second layer of glass is formed of at least one other rigid piece of glass assembled with said first piece, said preform being produced by the steps of heating and drawing the assembly of said first and second pieces of glass to a reduced cross-sectional size and rolling said heated and drawn assembly to the desired flattened configuration of said preform.

7. The method according to claim 1 wherein said step of covering at least one side of said first layer of glass is accomplished by directing a glass vapor onto said first layer for condensation thereon as said second layer thereby producing said preform.

8. The method according to claim 1 wherein said step of heat softening and shaping said portion of said preform is preceded by a step of cutting said portion away from said preform.

9. The method according to claim 1 wherein said step of removing said covering layer of glass is performed by exposing said layer to a chemical leaching medium.

10. The method of making a lens having at least one finished surface of ophthalmic quality comprising the steps of:

forming a first layer of glass of the type desired of said lens, said first layer being of at least the thickness, width and length dimensions desired of said lens;

covering at least one side of said first layer of glass with a second relatively thin layer of a removable glass during one stage of the forming of said first layer and fusing the covering layer of glass interfacially to said first layer of glass, the combination of said layers of glass comprising a preform of said lens;

flattening said preform to a degree of precision producing a finish of ophthalmic quality upon said first layer of glass adjacent said covering layer;

heat softening and shaping at least a portion of said preform to a meniscus configuration; and removing said covering layer of glass from said portion of said preform to expose the underlying surface of said first layer of glass, said underlying surface constituting said one finished surface of said lens.

* * * * *